United States Patent
Merrick et al.

(10) Patent No.: US 11,872,720 B2
(45) Date of Patent: Jan. 16, 2024

(54) MICROSTRAND INTERFACE LAYER FOR IMPROVED ENGINEERED WOOD PRODUCTS

(71) Applicant: LOUISIANA-PACIFIC CORPORATION, Nashville, TN (US)

(72) Inventors: Gareth Paul Merrick, Gig Harbor, WA (US); Brian St. Germain, Mt. Juliet, TN (US)

(73) Assignee: LOUISIANA-PACIFIC CORP., Nashville, TN (US)

(*) Notice: Subject to any disclaimer, the term of this patent is extended or adjusted under 35 U.S.C. 154(b) by 0 days.

(21) Appl. No.: 17/983,118

(22) Filed: Nov. 8, 2022

(65) Prior Publication Data

US 2023/0143301 A1    May 11, 2023

Related U.S. Application Data

(60) Provisional application No. 63/276,913, filed on Nov. 8, 2021.

(51) Int. Cl.
*B32B 21/02* (2006.01)
*B27N 3/14* (2006.01)
*B27N 3/24* (2006.01)

(52) U.S. Cl.
CPC ............... *B27N 3/143* (2013.01); *B27N 3/24* (2013.01); *B32B 21/02* (2013.01)

(58) Field of Classification Search
None
See application file for complete search history.

(56) References Cited

U.S. PATENT DOCUMENTS

| 4,364,984 A | 12/1982 | Wentworth |
| 5,425,976 A | 6/1995 | Clarke et al. |
| 6,461,743 B1 * | 10/2002 | Tanzer .................. B27N 7/005 428/528 |
| 2009/0098387 A1 | 4/2009 | Brady et al. |
| 2018/0126584 A1 | 5/2018 | Ritter |
| 2020/0156347 A1 | 5/2020 | Kuvik |
| 2020/0247002 A1 | 8/2020 | Merrick et al. |

OTHER PUBLICATIONS

International Search Report and Written Opinion, PCT/US22/049291, Lousiana-Pacific Corp. (international filing date Nov. 8, 2022).
International Search Report and Written Opinion, PCT/US22/034893, Lousiana-Pacific Corp. (international filing date Jun. 24, 2022).
International Search Report and Written Opinion, PCT/US22/034051, Lousiana-Pacific Corp. (international filing date Jun. 17, 2022).

* cited by examiner

*Primary Examiner* — Alexander S Thomas
(74) *Attorney, Agent, or Firm* — Wayne Edward Ramage; Baker Donelson

(57) ABSTRACT

An engineered wood based siding, cladding or panel with a microstrand interface layer (MIL) applied to the top of the main strand matrix layers to minimize telegraphing, add rigidity and strength, and provide an improved surface appearance. The MIL comprises microstrands applied to the surface of the strand matrix or mat during production, prior to deposition of a fines layer. The MIL prevents the loss of fines into the strand matrix, and helps prevent or eliminate strand telegraphing.

20 Claims, 4 Drawing Sheets

MICROSTRAND INTERFACE LAYER FOR IMPROVED ENGINEERED WOOD PRODUCTS

This application claims benefit of and priority to U.S. Provisional Application No. 63/276,913, filed Nov. 8, 2021, which is incorporated herein in its entirety by specific reference for all purposes.

FIELD OF INVENTION

This invention relates to a system and process for producing an engineered wood-based siding, cladding or panel (e.g., manufactured with wood veneer, strands or fibers) with a microstrand interface (MIL) layer to minimize telegraphing and improve the surface appearance of the final product.

BACKGROUND OF INVENTION

Engineered wood products (such as oriented strand board (OSB), laminated strand lumber (LSL), laminated veneer lumber (LVL), particleboard or plywood) are typically produced by various primary (and sometimes secondary) pressing processes. Examples of such processes are in U.S. Pat. Nos. 3,098,781; 4,364,984; 6,461,743; 5,718,786; 5,525,394; 5,470,631; and 5,425,976; and U.S. patent application Ser. No. 15/803,771, all of which are incorporated herein in their entireties by specific reference for all purposes. OSB, for example, is a panel or board made of strands (also referred to as flakes or wafers) of wood, with a typical size range of about 75-150 mm (approx. 3-6 inches) long, about 15-25 mm (approx. 0.6 to 1 inch wide) wide, and about 0.3 to 0.7 mm (approx. $\frac{1}{32}$") thick, that have a particular orientation or orientations by design.

The nature of the engineered wood manufacturing process results in inherent sub-surface and surface defects or imperfections. Sub-surface defects often result in visible defects or imperfections on the surface (commonly referred to as "telegraphing"). Telegraphing on products in use (after manufacturing) is typically caused by moisture, i.e., a swelling response inherent to all wood products. This response can vary in severity based on several factors, including, but not limited to, wood geometry (e.g., strand, fiber, particle, strand) and density of the product. Surface quality may also be influenced by variation in local density and the presence of voids (i.e., areas without wood fiber) that are close to the product's surface. For example, a difference in surface texture may result directly from the pressing process, where a localized difference in density (e.g., void, no-void, or more/less wood fiber) results in a differential response to the press plate pressure.

Deeply or aggressively embossed or textured surfaces often can distract the eye from noticing these imperfections, but smooth (non-embossed or minimally embossed) surfaces are more susceptible to having this telegraphing become noticeable, especially under critical light conditions. This is a particular problem with engineered wood based smooth surface siding or cladding when installed on a building, where varying light conditions and viewing angles make undesirable surface imperfections noticeable.

During the manufacturing of larger strand-based engineered wood products, several formers (typically four, five or six) with orientation heads apply strands in multiple layers to a continuously moving conveyor belt. Each forming head will inevitably have a varying number of strands layered on top of one another to form an intertwined layer of stands. As each forming head operates independently from one another, the variation of the number of strands that is ultimately achieved in any one location in the final layered mat contains the combined variation of all the forming heads. This variation is advantageous in the pressing process as it helps to better facilitate the escape of volatilized water that is necessary to mold the strands together under high heat and pressure during the pressing process, resulting in a structural panel product. However, when using such products in an aesthetic application, such as exterior cladding, this variation in the number of strands that comprise the thickness of the product creates some challenges. As strands are still relatively large particles of wood, as compared to the fines used in other wood composites such as MDF (medium density fiberboard) and particleboard, an engineered wood product comprised of strands is still subject to the inherent properties of the wood itself.

One such property is the change in dimension in response to a change in moisture content. All wood species expand and contract at various levels in response to changing moisture conditions. This is largely due to the transport systems within the wood cell structure itself which are intended to carry water through a living tree. As strands are still large pieces of wood, these transport systems largely remain intact within each strand. With a varying number of strands within each location across the panel, and each strand responding with a change in dimension as moisture conditions change within the panel, there is the potential for differential thickness swell across the surface of any panel. In products that are used in aesthetic applications, such as exterior cladding, even subtle (i.e., less than 0.002") differences in thickness can be seen by the naked eye in critical light conditions. Therefore, it becomes a requirement of utilizing a strand-based product in these aesthetic applications to effectively control this differential movement or strands from becoming visible in addition to the other inherent surface imperfections that occur in a strand based product manufacturing process.

One approach is the application of a loose "fines layer" to the surface of the multi-layer strand matrix or mat during the manufacturing process. The fines in the fines layers comprise loose "wood flour" or small particles of wood, typically a by-product from the manufacturing processing with no optimization (i.e., no sorting or classifying). This functional fines layer is added to help minimize telegraphing of strands or flakes on the surface of the siding or finished product. However, a portion of the fines fall into open spaces or voids in the strand matrix, which reduces the effectiveness of the fines layer in resisting strand telegraphing. Adding additional fines may partially overcome this problem, but this creates an unbalanced section that can decrease the product's stiffness and strength. For panel products, it may also impact product stability. An example of instability is warping or the product not remaining flat. These properties are especially important for engineered wood composites that are used in structural applications.

U.S. Pat. No. 6,461,743 defines "fines" as wood particles having an average width and thickness several times smaller than the width of the wood strands used to form strand matrix layers. It also notes that fines typically may be defined as wood particles having a width and thickness less than 0.50 mm. If further describes the use of particles where the average size of smaller particles is less than the average size of the materials comprising the mat, where the smaller particles have an average particle size of not more than about 2 mm, and more preferably an average particle size of not more than about 1 mm. The application of both a fines interface layer and a pre-consolidated fines layer to the surface of the multi-layer strand matrix or mat during the manufacturing process are described in, respectively, U.S. Provisional Applications Nos. 63/221,587, filed Jun. 17, 2021, and 63/214,299, filed Jun. 24, 2021, and U.S. application Ser. No. 17/843,544, filed Jun. 17, 2022, and Ser. No. 17/849,913, filed Jun. 24, 2022, which are incorporated herein in their entireties by specific reference for all purposes.

SUMMARY OF INVENTION

In various exemplary embodiments, the present invention comprises a method or process for producing an engineered wood-based siding, cladding or panel (e.g., manufactured with wood veneer, strands, flakes, particles or fibers) that includes a microstrand interface layer (MIL) to minimize telegraphing and provide an improved surface appearance. In several embodiments, the MIL is applied and located between the multi-layer strand matrix and the surface fines layer prior to or simultaneously to application of the fines interface layer and performance overlay. The MIL may itself be made in the same or a different process and at the same or a different facility as the final engineered wood composite product and may have a performance overlay (e.g., paper overlay) or a pre-consolidated fines layer, or both, laminated to it prior to being applied to the strand substrate layer. The MIL sits between the strand matrix and the fines (loose or pre-consolidated) layer and reduces or eliminates the loss of fines into the strand matrix (i.e., into open space or voids in the strand matrix) and the telegraphing of the multi-layer strand matrix on the surface. The MIL thus keeps the loose or pre-consolidated fines in the ideal location for effectively and efficiently preventing or eliminating strand telegraphing in a product with a smooth finished surface.

The MIL may comprise one or more layers of cellulose, non-cellulose or blends of cellulose and non-cellulose objects having dimensions (length, width, thickness) relatively smaller than the strands or flakes in the multi-layer strand mix and relatively larger than the particles used in the fines layer. The dimensions of these objects may have a similar or different aspect ratio than those in the multi-layer strand mix.

DETAILED DESCRIPTION OF EXEMPLARY EMBODIMENTS

Figure 1:
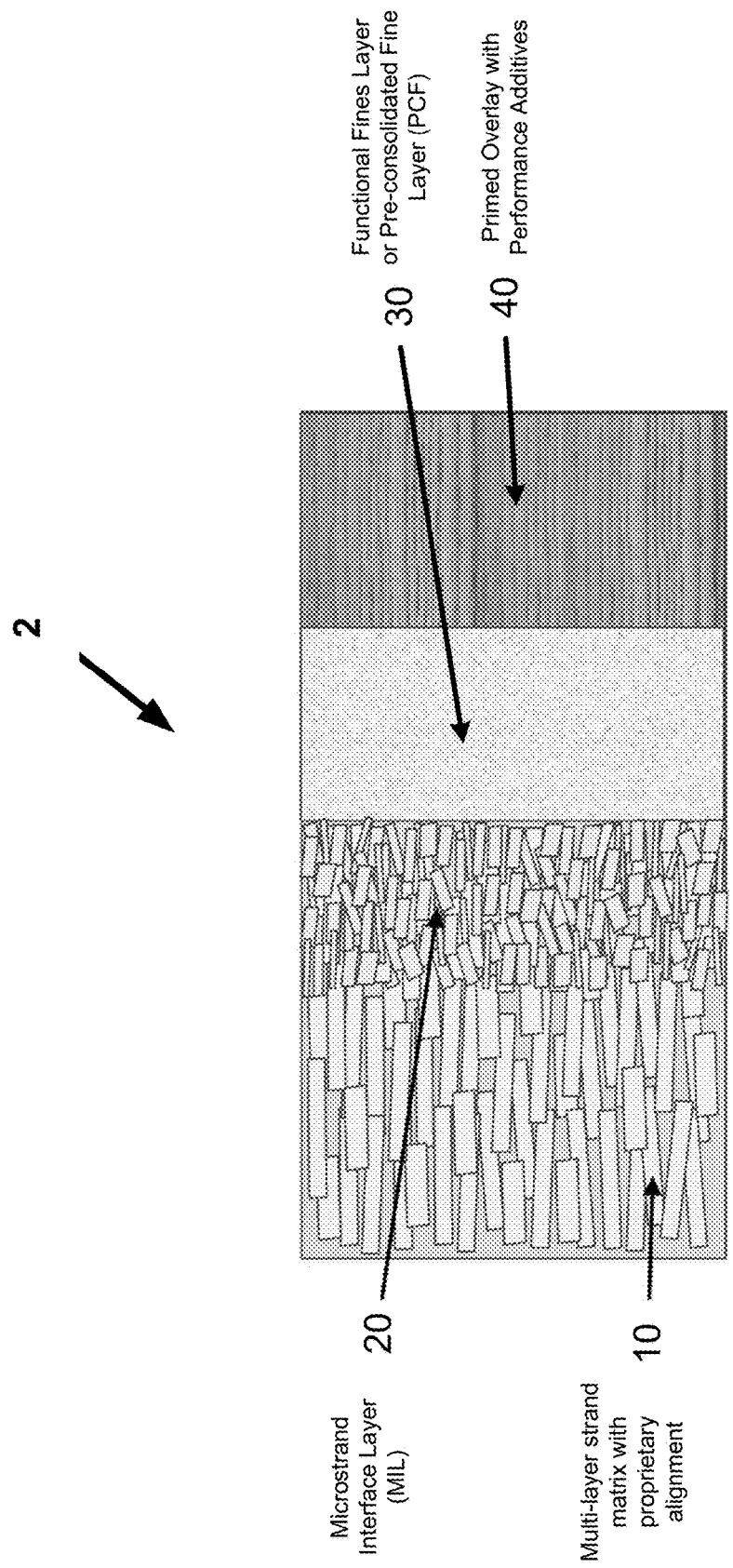
FIG. 1 shows a top partial view of a manufactured wood product with a microstrand interface layer (MIL) on a multi-layered strand matrix (not to scale).
Figure 2:
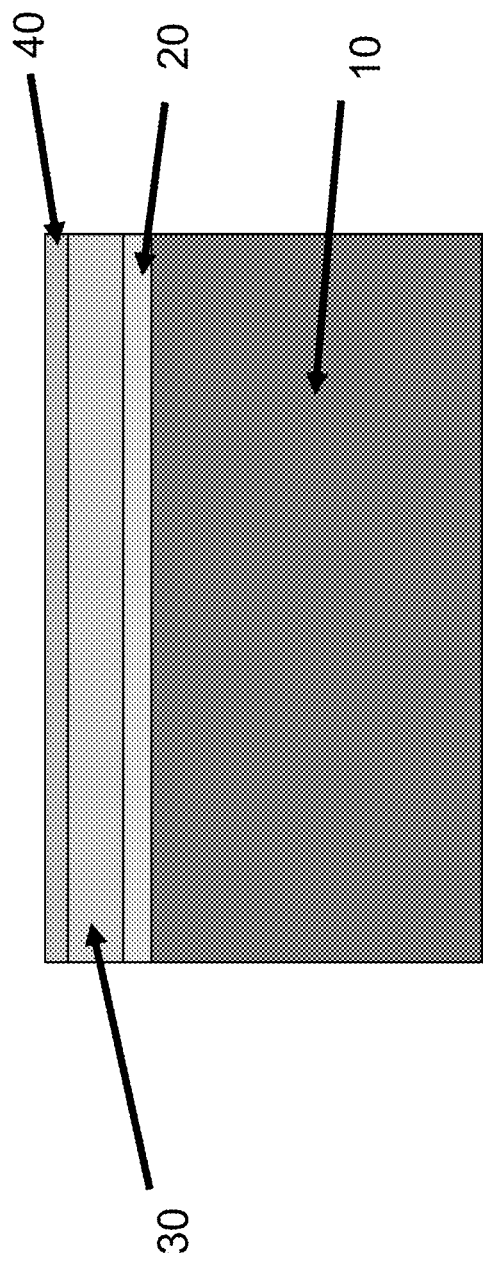
FIG. 2 shows a partial side view of FIG. 1 (not to scale)

In various exemplary embodiments, the present invention comprises a method or process for producing an engineered wood-based siding, cladding or panel (e.g., manufactured with wood veneer, strands, flakes, particles or fibers) 2 that includes a microstrand interface layer (MIL) 20 to minimize telegraphing and provide an improved surface appearance. In several embodiments, the MIL 20 is applied and located between the multi-layer strand matrix 10 and the surface or functional fines layer 30 prior to or simultaneously to application of the fines layer 30 and performance overlay 40. The MIL may itself be made in the same or a different process and at the same or a different facility as the final engineered wood composite product 2 and may have a performance overlay (e.g., paper overlay) or a pre-consolidated fines layer, or both, laminated to it prior to being applied to the strand substrate layer. The MIL sits between the strand matrix and the fines (loose or pre-consolidated) layer and reduces or eliminates the loss of fines into the strand matrix (i.e., into open space or voids in the strand matrix) and the telegraphing of the multi-layer strand matrix on the surface. The MIL thus keeps the loose or pre-consolidated fines in the ideal location for effectively and efficiently preventing or eliminating strand telegraphing in a product with a smooth finished surface.

While the discussion herein primarily discusses the use of an MIL with a functional fines layer, it may also be used with a preconsolidated fines layer (PCF), as described in U.S. patent application Ser. No. 17/849,913, filed Jun. 24, 2022, which is incorporated herein by specific reference for all purposes. The PCF replaces the loose fines layer, as described above, and has a consolidated nature at the time of application to the strand matrix or mat. The PCF may itself be made in the same or a different process and at the same or a different facility as the final engineered wood composite product. In several embodiments, the PCF comprises a layer of fines material that are consolidated together prior to application to the MIL layer of the matrix strands. The fines may be consolidated through various processes. In some embodiments, the fines are consolidated through adhesives or glues. In additional embodiments, a backer or similar material may be used to effect consolidation. In alternative embodiments, the PCF may comprise a fabric (such as, but not limited to, a woven or non-woven synthetic or natural material), specialty papers, resin-saturated papers, pulp mats, glue (adhesive) films, plastic films, minerals, or similar materials. In several embodiments, the performance overlay may be laminated to the PCF (or vice-versa) prior to the combined performance overlay and PCF being applied to the MIL on the strand matrix.

The MIL may comprise one or more layers of cellulose (cellular), non-cellulose (non-cellular) or blends of cellulose and non-cellulose objects having dimensions (length, width, thickness) relatively smaller than the strands or flakes in the multi-layer strand mix and relatively larger than the particles used in the fines layer. The dimensions of these microstrand objects may have a similar or different aspect ratio than those in the multi-layer strand mix. For example, strands in a multi-layer strand mix typically have a length three times the width, 3:1 (i.e., generally, long and narrow). A microstrand may also be long and narrow, but with absolute dimensions less than those in the multi-layer mix (e.g., up to 1 inch long, compared to the more typical 3 to 6 inches for strands in the multi-layer mix). However, the microstrands may also have dimensions with an aspect ratio less than, for example 3:1 (i.e., less long and less narrow, and more rectangular or square, e.g. 1:1). They may also have an aspect ratio larger than those of the multi-layer mix (i.e., more long, more narrow). In one embodiment the microstrand may be relatively square with a thickness relatively equal to the strands in the multi-layer mix.

In one embodiment, the microstrands range from ¾" to 1" in length, with a corresponding range of widths (e.g., ¼" to 1" in width). This length range is chosen to correspond to the greater length and dimensions of the larger strands in the strand matrix 10, as described above, which in turn are chosen by design to provide the necessary structural stability and strength for the resulting engineered wood panel, board or plank. A product made entirely of microstrands, for example, would not have the strength, stability and other characteristics to function as an OSB panel or board, with larger strands as known in the industry.

A purposefully varied mixture of microstrand dimensions may be utilized to provide one or more specific performance objectives. Unlike fines, microstrands are engineered objects made of carefully chosen material(s) and of specific dimension(s) and of purposeful orientation to each other and the multi-layer strand mix. Orientations may include, for example, microstrands oriented parallel to, diagonal to, and or perpendicular to other microstrands in the MIL, or a mixture of such orientations.

The addition of one or MILs to the engineered wood product, as described above, provide several advantages. It helps prevent telegraphing of the flakes or strands in the strand matrix by preventing movement and/or swelling of the those flakes and strands. It also helps provide enhanced rigidity to the engineered wood product due to its purposeful selection of materials of particular orientations and dimensions, thereby resulting in a more robust and stronger product. The intertwined microstrand materials also are bonded together, thereby also providing additional rigidity, strength, and robustness.

Materials or ingredients used for and in a MIL must be compatible with the manufacturing process, to include any adhesive, heat and pressure or performance additive that may be used. In some embodiments, the microstrand is prepared from the same material as the strands in the multi-layer mix (e.g., wood cellulose). In other embodiments, the MIL material is prepared from non-wood cellulose or non-wood materials (e.g., glass or glass-like material, plastic films, woven or non-woven cloth materials of natural or synthetic origin. MIL material may be adhered to or bonded to itself and adjacent material layers using the same or different adhesives, or they may be self-bonding (e.g., flow or melt under heat and pressure) during the pressing process.

In other embodiments, a stiffening or reinforcement additive may be applied before the mat is assembled, in others it can be applied while the mat is being assembled so that the MIL becomes stiffer and stronger during the manufacturing process, thereby imparting strength and stiffness to the final product itself. These reinforcement materials may have various forms and be applied in various ways. As an example, spray-applied liquids or powder/particle additives that flow under heat and pressure. In another example, a mesh or fiber-like additive is incorporated into the MIL layer. For applications performed separately from the mat assembly process, the liquid can be pressure or vacuum impregnated into the MIL material or allowed to absorb over time under ambient conditions. Alternatively, the reinforcement may be applied to a sheet-like material that is subsequently processed into the MIL material(s).

Additionally, incorporating specialty additives into or onto this microstrand layer provides for targeted performance improvement with respect to fire, moisture resistance and biological attack. Examples include, but are not limited to, fire retardants, hydrophobic compounds, fungicides, mold inhibitors, and/or insecticides (of natural or synthetic origin).

Figure 3:
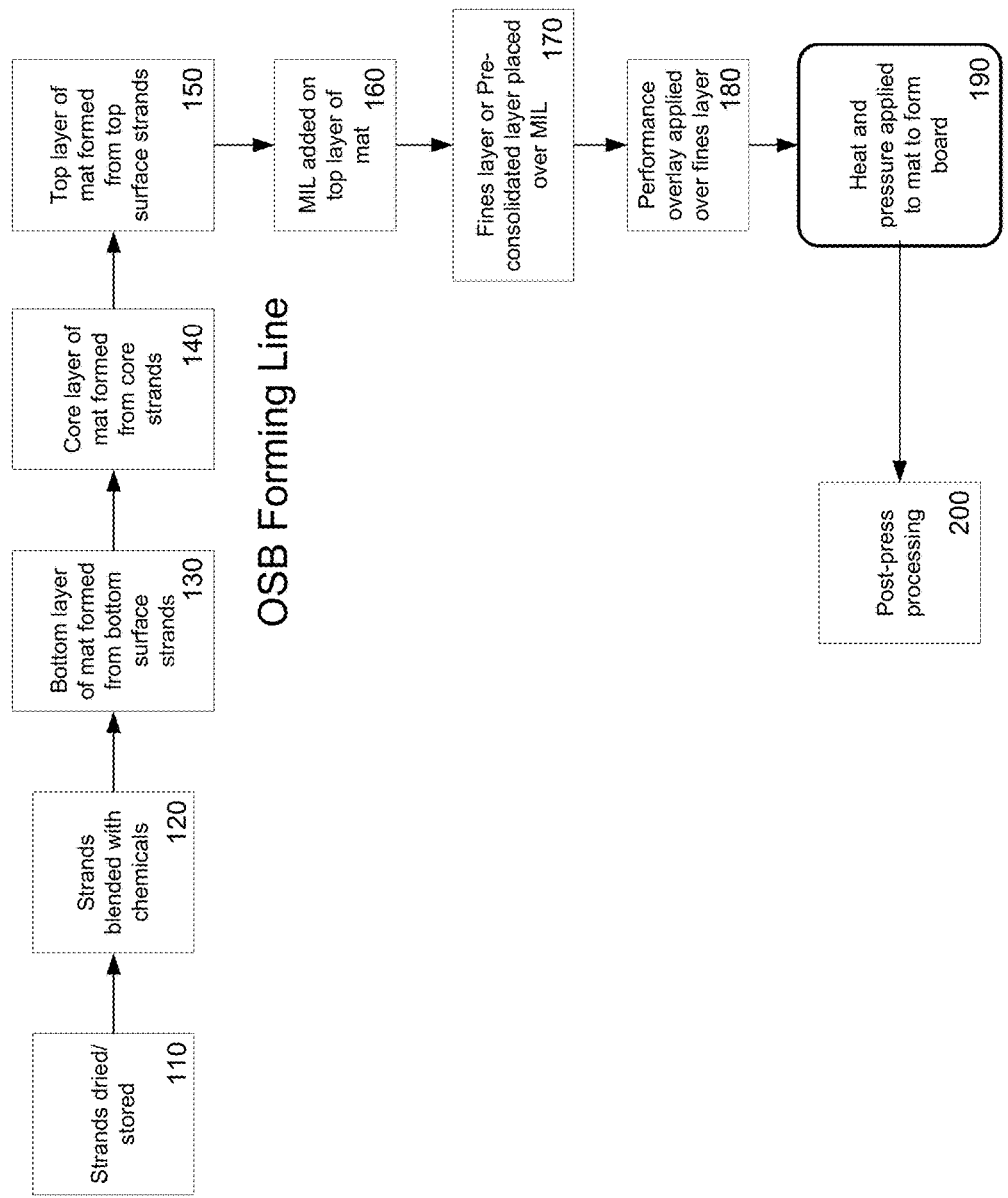
FIG. 3 shows a diagram of a method in accordance with the present invention.

One exemplary method of production comprises the following steps. Strands/flakes are processed/treated (i.e., cut, dried, and stored 110), then treated and/or coated with adhesive and performance enhancing additives and chemicals (e.g., wax, resin, and the like) 120. Strands designated for particular layers may receive different treatment, although in some cases strands are treated identically regardless of intended layer. The strands are then used to form the appropriate layers in order (e.g., first bottom surface, then core, then top surface), by depositing the designated strands 130, 140, 150 onto the production or forming line to form a multi-layer mat or strand matrix. The number of layers typically varies from 2 to 5 layers (FIG. 3 shows three layers). The MIL described above is then formed 160 on the upper surface of the multi-layer strand matrix or mat. The MIL may be formed on the upper surface by depositing the microstrand material in a similar manner to the strand matrix layers, and this process is suitable when the MIL materials are cellular (i.e., wood-based). When the materials are non-cellular, or partially non-cellular, while they may be deposited in a similar manner, but alternatively may be loosely delivered to customized forming heads, which then extrude or form the MIL as a layer on the upper surface of the mat. In some embodiments, the material forming the MIL may be subjected to heat and/or pressure and extruded onto the upper surface of the mat as it passes underneath the MIL former.

A functional fines layer or PCF layer, as described above, is then deposited or placed over the MIL 170. An overlay or performance overlay (such as, but not limited to, a paper overlay) 180 is then placed on top of the fines or PCF layer. The overlay may, for example, comprise a primed paper overlay with performance additives. The assembled, unbonded layers are then subjected to further processing depending on the final product desired. Suitable adhesives include but are not limited to those selected from an isocyanate, phenolic, hot-melt polyurethane or melamine category alone or in combination. Pressure may be applied using several methods including but not limited to a hot press, cold press or steam-injection press. The process may be continuous or non-continuous (batch) or a combination or hybridization of these. Heat may be conveyed using various methods, to include but not be limited to steam, microwaves, thermal oil and the like.

For example, in one embodiment the assembled, unbonded layers are conveyed into a press for final consolidation and bonding under pressure. In another embodiment, as seen in FIG. 3, the assembled, unbonded layers are conveyed into a hot press 190 for final consolidation and bonding under heat and pressure. In yet another embodiment, the assembled, unbonded layers are subjected to microwaves with or without a heated platen. In a further embodiment, the assembled, unbonded layers are subjected to super-heated steam. After pressing, the resulting board or panel may then be subject to further post-press processing 200 (e.g., additional overlays, secondary pressing or processing, trimming, sizing, priming, sealing, and packaging), depending on the desired final end product.

The present invention may be used with any engineered wood manufacturing process, regardless of the end-use application, including, but not limited to, structural panels, and siding panels or cladding. For example, it can be used with OSB manufactured as part of a "combination" product, such as, but not limited to, an OSB strand core with a radiant heat barrier laminate or magnesium oxide coating on one or both faces.

The material used for the MIL should be compatible with the particular manufacturing process, i.e., compatible with any adhesive, additives, heat and/or pressure that may be used. In some embodiments, for example, the manufacturing process comprises high temperatures and pressure. In several embodiments, the material should be able to withstand high temperatures up to 230 degrees F. While in some embodiments the MIL material may be chosen to withstand high temperatures and pressure, in alternative embodiments the MIL may be chosen so that the manufacturing process produces changes in the form or configuration of the MIL material (e.g., melting or flowing). Thus, for example, the MIL material may comprise glass or glass-like material, including, but not limited to, binding material that partially or fully melts, flows and/or bonds (adheres) during the pressing process.

Figure 4:
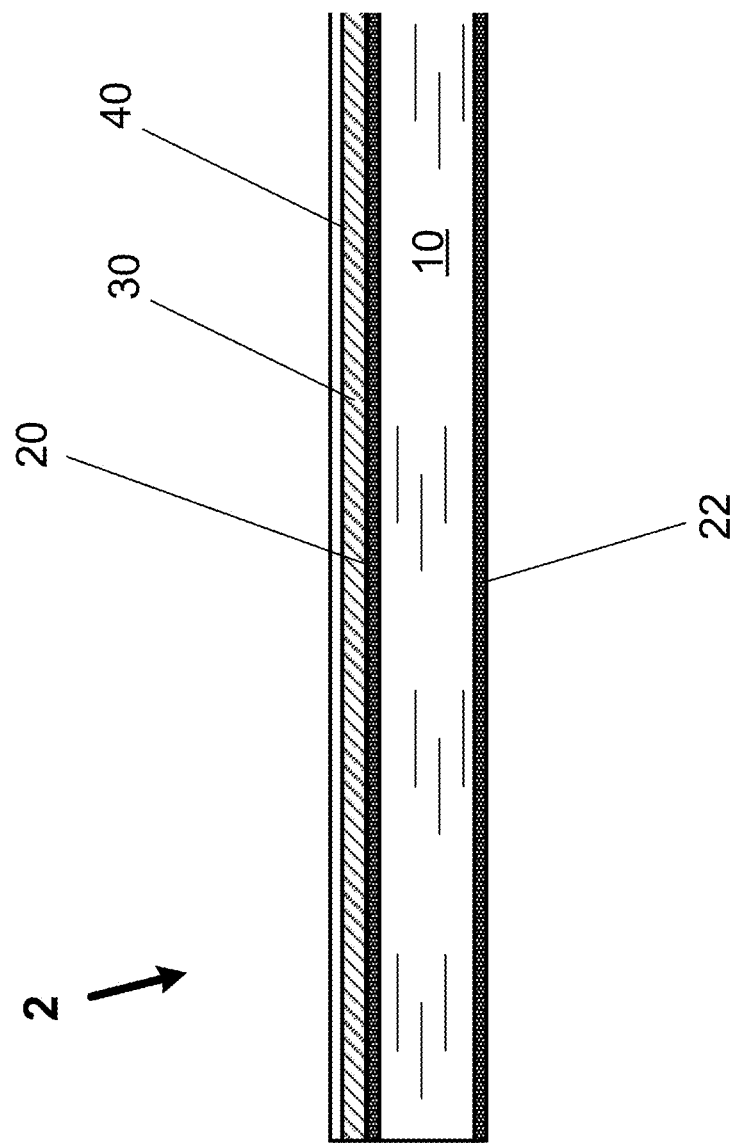
FIG. 4 shows a top partial view of a manufactured wood product with two microstrand interface layers (MILs), one each on upper and lower surfaces of a multi-layered strand matrix (not to scale).

Similarly, a microstrand interface layer may be used on one or both faces or surfaces of a product (i.e., a one or two-surface smooth product). If a single MIL is used, it may be used on the bottom surface or top surface of the product. Thus, the MIL may be used on the top surface only, the bottom surface only, or on both surfaces. FIG. 4, for example, shows two MILs, one MIL 20 on the top surface and one MIL 22 on the bottom surface. In a product manufactured using an MIL on both the top and bottom surfaces, the MIL may be of the same or different construction.

According, in one embodiment, the invention comprises a method of producing an engineered wood product, comprising the steps of:
   forming a multi-layer strand matrix on a production line, said strand matrix comprising a top surface with strands of an average first length and an average first width;
   applying a microstrand interface layer on the top surface of the strand matrix, said microstrand interface layer comprising microstrands with a second length and second width, wherein the second length is less than or equal to one-half of the average first length, said microstrand interface layer further comprise an upper surface opposite the strand matrix;
   applying a fines layer on the upper surface of the microstrand interface layer; and
   consolidating and bonding the strand matrix, the microstrand interface layer, and the fines layer together using heat and/or pressure.

The fines layer may comprises a pre-consolidated fines layer, said pre-consolidated fines layer comprising fines consolidated prior to application to the upper surface of the microstrand interface layer. Alternatively, the fines layer comprises loose fines material deposited on the upper surface of the microstrand interface layer. The microstrands comprise wood-based cellular material, or may comprise non-wood-based cellular material, in whole or in part. The MIL may comprise a plastic film, or glue or adhesive film. The MIL may partially or fully melt during the step of consolidating. The MIL may comprise a stiffener. The MIL may provide one or more of the following: fire resistance; fungal resistance; moisture resistance; and sound dampening.

The method may further comprise the step of an applying an overlay on the fines layer opposite the microstrand interface layer. The overlay may be a paper overlay, and may be a resin-impregnated paper overlay. The step of consolidating and bonding comprises application of heat and pressure using a hot press. The step of consolidating and bonding may comprise application of pressure using a cold press. The step of consolidating and bonding may comprise application of microwaves with or without a heated platen, and/or may comprise application of super-heated steam.

The microstrands are deposited on the top surface in a particular orientation with respect to each other, and/or with respect to the strands in the strand matrix. The second length (i.e, length of the microstrands) may bee less than or equal to one-third, or one-fourth, of the average first length. The second width may be between approximately 50% to approximately 100% of the second length. The second width may be approximately 25% or greater of the second length. In some embodiments, the second width may be 10% or greater of the second length.

Thus, it should be understood, that the embodiments and examples described herein have been chosen so as to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A improved method of producing an engineered wood product, comprising the steps of:
   forming a multi-layer strand matrix on a production line, said strand matrix comprising a top surface with strands of an average first length and an average first width;
   applying a microstrand interface layer on the top surface of the strand matrix, said microstrand interface layer comprising microstrands with a second length and second width, wherein the second length is less than or equal to one-half of the average first length, said microstrand interface layer further comprise an upper surface opposite the strand matrix;
   applying a fines layer on the upper surface of the microstrand interface layer;
   consolidating and bonding the strand matrix, the microstrand interface layer, and the fines layer together using heat and/or pressure.

2. The method of claim 1, wherein the fines layer comprises a pre-consolidated fines layer, said pre-consolidated fines layer comprising fines consolidated prior to application to the upper surface of the microstrand interface layer.

3. The method of claim 1, wherein the fines layer comprises loose fines material deposited on the upper surface of the microstrand interface layer.

4. The method of claim 1, wherein the microstrands comprise wood-based cellular material.

5. The method of claim 1, wherein the microstrands comprise non-wood-based cellular material in whole or in part.

6. The method of claim 1, wherein the microstrand interface layer comprises a plastic film, or glue or adhesive film.

7. The method of claim 1, wherein the microstrand interface layer partially or fully melts during the step of consolidating.

8. The method of claim 1, wherein the microstrand interface layer comprises a stiffener.

9. The method of claim 1, wherein the microstrand interface layer provides one or more of the following: fire resistance; fungal resistance; moisture resistance; and sound dampening.

10. The method of claim 1, further comprising the step of an applying an overlay on the fines layer opposite the microstrand interface layer.

11. The method of claim 1, wherein the step of consolidating and bonding comprises application of heat and pressure using a hot press.

12. The method of claim 1, wherein the step of consolidating and bonding comprises application of pressure using a cold press.

13. The method of claim 1, wherein the step of consolidating and bonding comprises application of microwaves with or without a heated platen.

14. The method of claim 1, wherein the step of consolidating and bonding comprises application of super-heated steam.

15. The method of claim 1, wherein the microstrands are deposited on the top surface in a particular orientation with respect to each other, and/or with respect to the strands in the strand matrix.

16. The method of claim 1, wherein the second length is less than or equal to one-third of the average first length.

17. The method of claim 1, wherein the second width is between approximately 33% to approximately 100% of the second length.

18. An engineered-wood product produced by the method of claim 1.

19. The product of claim 18, wherein the engineered-wood product is an Oriented-Strand Board (OSB) plank, board or panel.

20. The product of claim 18, wherein the engineered-wood product is a structural panel or board, a siding panel or board, cladding, or a panel.

* * * * *